Figure 3:
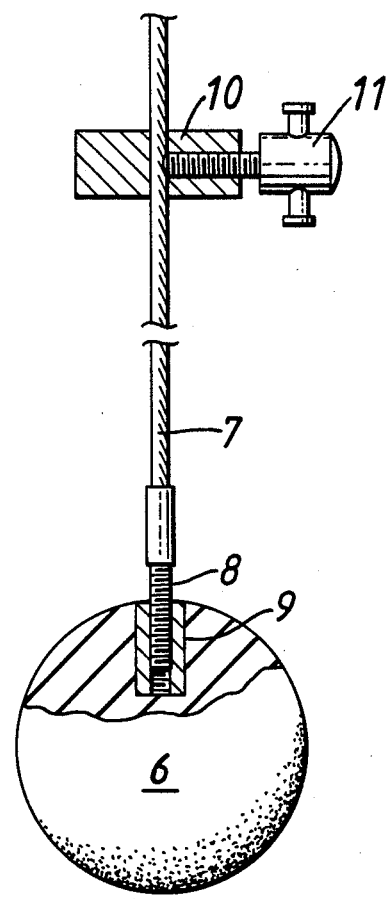

United States Patent [19]

Smith

[11] Patent Number: 4,911,193

[45] Date of Patent: Mar. 27, 1990

[54] TEMPORARY OR PERMANENT BLOCKING OF THE BORE OF A PIPE

[75] Inventor: Peter Smith, Wirral, England

[73] Assignee: British Gas plc, London, England

[21] Appl. No.: 221,433

[22] Filed: Jul. 19, 1988

[30] Foreign Application Priority Data

Jul. 23, 1987 [GB] United Kingdom ............... 8717404
Dec. 15, 1987 [GB] United Kingdom ............... 8729183

[51] Int. Cl.⁴ .................... F16K 43/00; F16L 55/10; F16L 55/18
[52] U.S. Cl. ..................................... 137/15; 137/318; 138/89; 138/97
[58] Field of Search ................. 137/15, 315, 317, 318; 138/89, 93, 94, 97

[56] References Cited

U.S. PATENT DOCUMENTS

| | | | |
|---|---|---|---|
| 1,850,040 | 3/1932 | Turner | 138/89 |
| 2,299,365 | 10/1942 | Valuch | 138/89 |
| 2,588,188 | 3/1952 | Weisman | 138/94 |
| 2,763,282 | 9/1956 | Reedy et al. | 137/318 |
| 3,032,069 | 5/1962 | Ficklin | 137/315 |
| 3,091,260 | 5/1963 | Milanovits et al. | 138/94 |
| 3,245,257 | 4/1966 | Anderson | 137/315 |
| 3,382,888 | 5/1968 | Mueller et al. | 138/94 |
| 3,889,714 | 6/1975 | Wilger et al. | 138/89 |
| 4,299,255 | 11/1981 | Miller | 137/15 |
| 4,440,194 | 4/1984 | Kinumoto et al. | 138/89 |
| 4,503,880 | 3/1985 | Hochman | 138/89 |

Primary Examiner—George L. Walton
Attorney, Agent, or Firm—Larson & Taylor

[57] ABSTRACT

A method is provided for temporarily or permanently blocking the bore of a gas service pipe 5. In the method a resilient ball 6 is forced along the pipe 5 from the gas meter tap end of the pipe 5 by gas pressure, the ball 6 forming a force fit sufficient to resist any attempt to dislodge it by the pressure of gas in the pipe 5. The ball 6 is forced to a position where it is outside the gas consumer's premises 1.

28 Claims, 2 Drawing Sheets

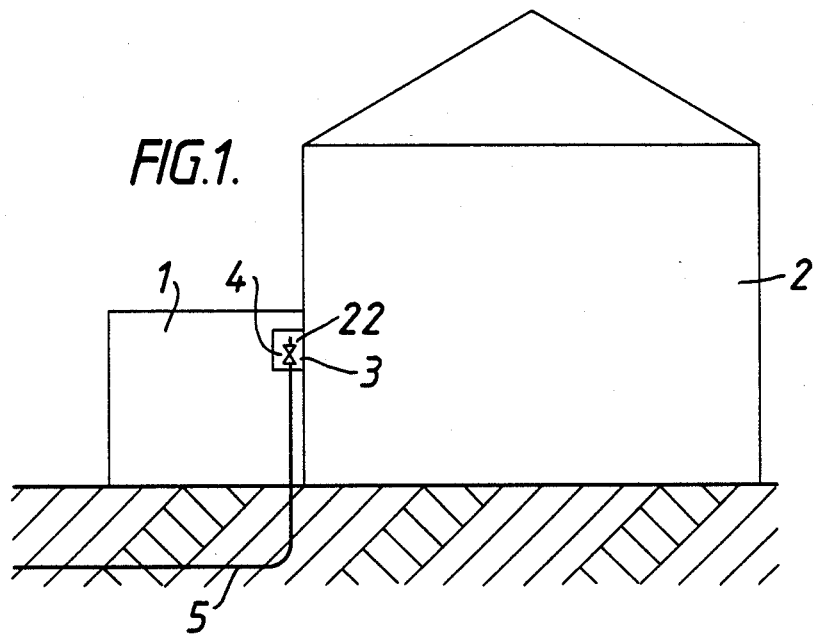
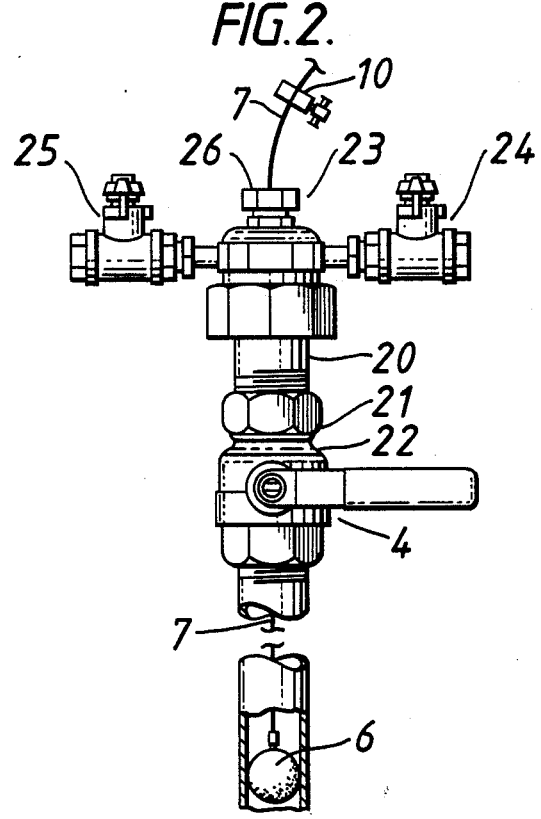

TEMPORARY OR PERMANENT BLOCKING OF THE BORE OF A PIPE

The present invention relates to the temporary or permanent blocking of the bore of a pipe through which fluid flows and is particularly directed to the temporary blocking of a service pipe carrying natural gas.

Should a gas supplying authority wish to cut of the supply of gas to a consumer for any reason (eg. the consumer has defaulted on payment of a bill), safety regulations require that the gas supply be eventually cut off at a point outside the consumer's property or premises.

One method of achieving this is to dig down outside the property or premises to the service pipe connection to the main and then to cut the service pipe and plug it with a settable sealing compound to cut off the supply.

In the case where the property comprises a block of flats the service pipe may be sealed by an expanding polyurethane foam.

The above method is inconvenient since it involves excavation to cut off the supply and it is therefore an object of the present invention to provide a method for cutting off a gas supply without this disadvantage.

According therefore to one aspect of the present invention we provide a method for temporarily or permanently blocking the bore of a pipe through which fluid flows, the method comprising gaining access to the bore of the pipe at a suitable point by opening or otherwise serving a pipe, and inserting into the pipe at the point a compressible seal which is adapted to form within the bore of the pipe a force fit sufficient to resist any attempt to dislodge it by the pressure of the the fluid and forcing the seal by a fluid pressure source means along the pipe counter to the direction of normal fluid flow to a position along the length of pipe upstream of the suitable point.

According to another aspect of the present invention we provide apparatus for temporarily or permanently blocking the bore of a pipe through which fluid flows, the apparatus comprising a compressible seal for insertion into the pipe at a suitable point, the seal being adapted to form within the bore of the pipe a force fit sufficient to resist any attempt to dislodge it by the pressure of the fluid and means for forcing the seal along the pipe counter to the direction of fluid flow to a position determined by varying means on a tether within the pipe upstream of the suitable point.

According to yet another aspect of the present invention, we provide a resilient ball incorporating means permitting the ball to be releasably connected to a cable.

An embodiment of the invention will now be particularly described with reference to the drawings in which:

FIG. 1 is a schematic arrangement of a typical property connected to a natural gas supply, FIG. 2 illustrates suitable equipment for effecting the method, and FIG. 3 is a view partly in section of a suitable seal and associated cable and stop for limiting the distance travelled by the seal along the service pipe.

Referring to FIG. 1, there is shown located within an outhouse or garage 1 adjacent to the dwelling 2 a gas meter 3 and gas meter tap 4 which latter enables the consumer to turn off the gas supply. The gas is supplied to the meter 3 by means of a service pipe 5 which is connected at its far end to a feeder main (not shown). To satisfy safety regulations, should it prove necessary for the gas supplying authority to cut off the consumer, the gas supply must be cut off at a point outside the outhouse 1 ie. at a point in the service pipe which lies below ground.

In the case of the present invention, this is generally effected in the following manner.

Firstly, the gas meter tap 4 is closed to shut off the gas supply to the meter 3. Next the gas meter tap 4 is disconnected from the meter 3 and then a compressible seal is inserted into the now open outlet end of the gas tap 4, the seal forming within the tap 4 and also within the bore of the service pipe 5 a force fit sufficient to resist attempts by the gas pressure to dislodge it. The gas meter tap 4 is then opened and the seal is forced along the service pipe 5 to a suitable point beyond the outhouse eg. to a point in the underground section of the service pipe 5.

As shown in FIG. 3 the seal may be in the form of a ball 6 of a resilient compressible material eg. a resilient thermoplastic. The ball 6 may be forced along the service pipe 5 by pressurised gas eg. natural gas. The ball 6 itself is held on a flexible steel tether or cable 7. The latter has an externally threaded end 8 which is releasably screwed into an internally threaded bush 9 held captive within the ball 6. Varying means on the tether determines the length of tether to be located within the pipe behind the seal, the varying means comprising, for example, a movable stop 10 threaded on the cable 7 to adjust the length of cable 7 following the ball 6 for the purpose to be described. The stop 10 can be releasably secured to the cable 7 by means of a thumb-screw 11 which engages the cable 7 as shown.

The ball 6 is moved by a fluid pressure source means, the means could, for example, comprises an applied gas pressure pushing a grease lubricant ahead of it until the stop 10 engages with a predetermined limit means and the cable 7 becomes taught. The gas pressure behind the ball 6 is then released and the cable 7 unscrewed by twisting it to release its end 8 from the bush 9. The cable 7 can then be removed, the gas tap 3 closed and the service pipe 5 capped off, if necessary. The length of cable 7 between the ball 6 and the stop 10 can be adjusted to ensure that the ball 6 is outside the consumer's dwelling.

If it is intended permanently to block the bore of the pipe the ball may simply be left in position. In addition the pipe may be plugged with a suitable sealant at a point within the pipe between the ball and the pipe outlet.

If however, it is possible that the consumer may be reconnected at some time in the future the pipe is not plugged with sealant.

In order to reconnect the consumer to the gas supply the ball 6 may be sucked out of the service pipe by means of a vacuum pump.

It may be necessary to spray the walls of the service pipe with lubricant to effect such removal.

The equipment shown in FIG. 2 comprises a reception chamber 20 for the ball, having one end 21 for connection to the gas tap outlet 22 and an opposite end 23 comprising a gland (not shown) through which the cable 7 can be inserted, the gland in use forming a seal with the cable 7. Valves 24,25 on opposite sides of the chamber 20 provide means for connecting the chamber 20 to a source of compressed natural gas where the ball is to be forced up the pipe or to a vacuum pump where the ball is to be removed from the pipe. The opposite end 23 of the chamber 20 has a nut 26 serving as a limit for movement of the cable stop 10.

In use of the equipment to insert the ball 6 into the service pipe 5, the threaded end 8 of the cable 7 is inserted through the gland end of the chamber 20 and is then screwed into the threaded bush 9 of the ball 6. The ball 6 is then pulled by the cable 7 into the chamber 20. The chamber 20 is then connected to the gas tap outlet 22 (the tap at this stage being closed) and the valve 24 say is connected to a supply of compressed natural gas (the valves 24,25 being closed). The gas tap 4 is opened and then the valve 24 is opened causing the ball 6 to be forced along the service pipe 5 until the stop 10 engages with the nut 26. The stop 10 is then released from the cable 7 and is slid away from the nut 26 to enable the cable 7 to be released from the ball 6. Any excess gas pressure in the pipe 5 is released by opening the other chamber valve 25. The gas tap 4 may then be closed and the chamber 20 removed from the gas tap 4.

In order to remove the ball 6 from the pipe 6, the chamber 20 is reconnected to the gas tap 4 and a vacuum pump is connected to the valve 24 say (both valves 24,25 being closed at this stage). The gas tap 4 is opened and then the valve 24 is opened to cause the ball 6 to be sucked out from the service pipe 5 into the chamber 20. The gas tap 4 is then closed and the chamber 20 removed from the gas tap 4.

The method described enables the consumer to be cut off at a point outside the consumer's premises without the need to excavate whether the cut off is temporary or permanent. Where the cut-off may be temporary, reconnection can be made quite simply from within the consumer's premises once again obviating the need for excavation.

I claim:

1. A method for temporarily or permanently blocking a bore of a pipe at a predetermined position upstream from an end of the pipe to which a fluid flows, the method comprising the steps of connecting a seal to a tether which is releasable from the seal, opening a pipe to provide access to a pipe end, inserting the seal into the pipe end, forcing the seal by a fluid pressure source means along the pipe counter to a direction of normal fluid flow until a predetermined length of tether is located within the pipe behind the seal indicating that the seal has reached its predetermined position, said predetermined length being determined by a varying means on said tether, releasing the tether from the seal and withdrawing the length of tether from the end of the pipe, the seal having a compressible body adapted to form within the bore of the pipe a force fit sufficient both to resist any attempt to dislodge it by pressure of the normal fluid flow and to prevent any fluid flowing past it to the end of the pipe.

2. The method as claimed in claim 1 in which the varying means defines a distance between the seal and a marker located on the tether.

3. A method as claimed in claim 1 in which said varying means comprises a stop which, in use, travels from a first position to a second position as the seal passes along the pipe, the stop preventing the seal from moving beyond its predetermined position by engaging at its second position with an obstruction inhibiting further movement of the stop and thereby preventing further movement of the seal and tether.

4. A method as claimed in claim 3 in which the second position of the stop along the tether is adjustable to adjust the distance between the stop and the seal.

5. A method as claimed in claim 1 in which the seal and the tether are connected together by a releasable threaded connection.

6. A method as claimed in claim 5 in which the seal has an internally threaded bush and the tether has a correspondingly threaded end for engagement in the bush.

7. A method as claimed in claim 6 in which the seal is a resilient ball.

8. A method as claimed in claim 1 in which the seal is compressed radially by a wall of the pipe forming the bore.

9. A method as claimed in claim 8 in which the seal is a resilient ball having a diameter greater than that of the bore of the pipe.

10. A method as claimed in claim 1 in which the fluid pressure source means is a gas.

11. A method as claimed in claim 1 in which the fluid pressure source means and the fluid flowing in the pipe are similar.

12. A method as claimed in claim 32 in which the fluid pressure source means and the normal fluid flowing in the pipe are natural gas.

13. A method as claimed in claim 1 in which the pipe end terminates in a valve through which the seal is forced into the pipe.

14. A method for temporarily or permanently blocking a bore of a pipe to the flow of fluid towards one end of the pipe using a seal having a compressible body which is adapted to form within the bore of the pipe a force fit sufficient both to resist any attempt to dislodge it by pressure of the fluid and to prevent any fluid flowing past it to the end of the pipe, the method comprising the steps of opening a pipe to produce an open pipe end, inserting the seal into the pipe end, applying to seal a fluid pressure source means sufficient to force the seal along the pipe counter to a direction of normal flow of the fluid within the pipe, and releasing the fluid pressure source means when the seal has reached a position upstream of the end of the pipe so as to leave the seal at that position within the pipe, the seal being compressed radially by a wall of the pipe forming the bore.

15. A method as claimed in claim 14 in which the seal is a resilient ball having a diameter greater than the bore of the pipe.

16. A method as claimed in claim 14 in which the fluid pressure source means is a gas.

17. A method as claimed in claim 14 in which the fluid pressure source means and the normal fluid flowing within the pipe are similar.

18. A method as claimed in claim 17 in which the fluid pressure source means and the normal fluid flowing within the pipe are natural gas.

19. A method as claimed in claim 14 in which the pipe end terminates in a valve through which the seal is forced into the pipe.

20. Apparatus for temporarily or permanently blocking a bore of a pipe at a predetermined position upstream to a pipe end to which fluid flows, the apparatus comprising a seal for insertion into the end of an opened pipe, a tether for connection to the seal and fluid pressure source means for forcing the seal along the pipe counter to a direction of normal fluid flow until a predetermined length of tether is located within the pipe indicating that the seal has reached its predetermined position, the seal having a compressible body adapted to form within the bore of the pipe a force fit sufficient both to resist any attempt to dislodge it by pressure of the fluid and to prevent any fluid flowing past it to the end of the pipe and the tether being releasable from the seal so that when the seal has reached its predetermined position the tether may be released from the seal and withdrawn from the end of the pipe.

21. Apparatus as claimed in claim 20 in which the length of tether is determined by a distance between the seal and a marker on the tether.

22. Apparatus as claimed in claim 21 in which the marker is a stop for location on the tether, the stop, in use, travelling from a first to a second position as the seal and tether travel along the pipe, there being means at the second position to engage the stop and prevent further movement of the seal beyond its predetermined position.

23. Apparatus as claimed in claim 22 in which the stop is movable along the tether to adjust the distance between the stop and the seal.

24. Apparatus as claimed in claim 20 in which the means for forcing the seal and tether along the pipe counter to a direction of fluid flow comprises a chamber for temporarily housing the seal, the chamber having a first end for connection to the pipe end to which the fluid flows, a second end, a wall with an aperture through which, in use, the tether extends to connect to the seal and a source of compressed gas for connection to the second end, whereby with seal housed within the chamber while the first end is connected to the first end of the pipe and the second end is connected to the source of compressed gas, the seal is expelled from the chamber and forced along the pipe counter to the direction of fluid flow if a pressure of the compressed gas is greater than that of the fluid.

25. Apparatus for temporarily or permanently blocking the bore of a pipe with a seal adapted alone to form within the pipe a force fit sufficient to resist any attempt to dislodge it by a pressure of a fluid within the pipe, the apparatus comprising a chamber for temporarily housing the seal, the chamber having a first end for connection to the pipe end to which the fluid flows and a second end of the chamber whereby, with the seal housed within the chamber while the first end is connected to the end of an opened pipe and the second end is connected to a source of compressed gas, the seal is expelled from the chamber and forced along the pipe counter to a direction of normal fluid flow to a position upstream of the end of the pipe if a pressure of the compressed gas is greater than that of the fluid.

26. A seal which is adapted to form within a bore of a pipe a force fit sufficient both to resist any attempt to dislodge it by a pressure of a fluid and to prevent the fluid from flowing past it, the seal comprising a compressible body incorporating means permitting the body to be releasably connected to a tether.

27. A seal as claimed in claim 26 in which the body is a resilient ball.

28. A seal as claimed in claim 27 in which the body has an internally threaded bush for connection to an externally threaded end of a tether.

* * * * *